US009721620B2

(12) United States Patent  (10) Patent No.: US 9,721,620 B2
Sudo et al.  (45) Date of Patent: Aug. 1, 2017

(54) HERMETIC SEALING OF HARD DISK DRIVE USING LAMINATED FILM SEAL

(71) Applicant: HGST Netherlands B.V., Amsterdam (NL)

(72) Inventors: Kimihiko Sudo, Yokohama (JP); Takako Hayakawa, Hiratsuka (JP); Yuichi Arai, Kawasaki (JP); Yuta Onobu, Yokohama (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/964,453

(22) Filed: Dec. 9, 2015

(65) Prior Publication Data

US 2017/0169862 A1  Jun. 15, 2017

(51) Int. Cl.
*G11B 33/14* (2006.01)

(52) U.S. Cl.
CPC .................... *G11B 33/1486* (2013.01)

(58) Field of Classification Search
None
See application file for complete search history.

(56) References Cited

U.S. PATENT DOCUMENTS

| | | | | |
|---|---|---|---|---|
| 4,896,231 A * | 1/1990 | Hoppe | ............... | G11B 33/1466 360/99.15 |
| 5,150,267 A * | 9/1992 | Reinisch | ............... | G11B 25/043 360/99.19 |
| 5,279,873 A | 1/1994 | Oike | | |
| 5,282,101 A * | 1/1994 | Reinisch | ............... | G11B 25/043 360/99.19 |
| 5,357,386 A | 10/1994 | Haidari et al. | | |
| 5,568,341 A * | 10/1996 | Shikano | ............. | G11B 33/1466 360/99.18 |
| 5,600,509 A * | 2/1997 | Kawakami | ........... | G11B 33/121 360/97.21 |

(Continued)

FOREIGN PATENT DOCUMENTS

| | | |
|---|---|---|
| EP | 2916392 A1 | 9/2015 |
| GB | 2519664 A | 4/2015 |

(Continued)

OTHER PUBLICATIONS

Kimihiko Sudo et al., Hermetic Sealing of Hard Disk Drive Using Laminated Film Seal, U.S. Appl. No. 14/964,360, filed by same Applicant/Assignee on same date herewith.

(Continued)

*Primary Examiner* — Will J Klimowicz
(74) *Attorney, Agent, or Firm* — John D. Henkhaus

(57) ABSTRACT

A hermetically-sealed hard disk drive (HDD) utilizes a laminated film seal to seal an HDD cover-to-base interface. The laminated film seal may be constructed of a heat sealant layer hermetically-coupled to and forming a seal with the base, a barrier layer which inhibits gas from escaping from inside the HDD, and a film surface protective layer which protects the heat sealant and barrier layers. Embodiments may include a heat sealant layer comprising a thermoplastic polymer such as polypropylene, a barrier layer comprising a metal such as aluminum, and a film surface protective layer comprising a thermoplastic polymer such as polyethylene terephthalate.

21 Claims, 9 Drawing Sheets

(56) References Cited

U.S. PATENT DOCUMENTS

| | | | |
|---|---|---|---|
| 5,609,496 A | 3/1997 | Kilmer et al. | |
| 5,666,239 A | 9/1997 | Pottebaum | |
| 5,793,566 A * | 8/1998 | Scura | G11B 33/1466 360/99.18 |
| 6,266,207 B1 * | 7/2001 | Iwahara | G11B 33/08 360/99.18 |
| 6,934,126 B1 | 8/2005 | Berding et al. | |
| 6,970,322 B2 | 11/2005 | Bernett | |
| 7,199,970 B2 | 4/2007 | Boss et al. | |
| 7,218,473 B2 | 5/2007 | Bernett et al. | |
| 7,291,784 B2 | 11/2007 | Moore et al. | |
| 7,362,541 B2 * | 4/2008 | Bernett | G11B 33/1466 360/99.21 |
| 7,522,375 B2 * | 4/2009 | Tsuda | G11B 25/043 360/99.21 |
| 7,538,972 B2 | 5/2009 | Burts-Cooper et al. | |
| 7,692,891 B2 | 4/2010 | Hatchett et al. | |
| 7,709,078 B1 | 5/2010 | Sevier et al. | |
| 7,876,527 B2 | 1/2011 | Nakamiya et al. | |
| 8,014,167 B2 | 9/2011 | Gunderson et al. | |
| 8,059,364 B1 | 11/2011 | Andrikowich et al. | |
| 8,194,348 B2 | 6/2012 | Jacoby et al. | |
| 8,279,552 B2 * | 10/2012 | Stipe | G11B 25/043 360/99.18 |
| 8,335,050 B2 | 12/2012 | Kavosh et al. | |
| 8,451,559 B1 * | 5/2013 | Berding | G11B 25/043 360/99.21 |
| 8,525,024 B2 * | 9/2013 | Kaneda | F16J 15/064 174/386 |
| 8,533,934 B2 | 9/2013 | McGuire, Jr. et al. | |
| 8,564,900 B2 | 10/2013 | Hirono et al. | |
| 8,659,849 B2 * | 2/2014 | Hayakawa | G11B 25/043 360/97.22 |
| 8,699,179 B1 | 4/2014 | Golgolab et al. | |
| 8,854,766 B1 * | 10/2014 | Gustafson | G11B 33/1486 360/97.12 |
| 8,885,290 B1 * | 11/2014 | Gustafson | G11B 33/1466 360/97.16 |
| 9,025,279 B2 * | 5/2015 | Furuta | G11B 33/1446 360/99.21 |
| 9,196,303 B2 | 11/2015 | Hirano et al. | |
| 9,431,759 B2 | 8/2016 | Hirano et al. | |
| 9,460,756 B1 * | 10/2016 | Forbord | G11B 33/14 |
| 9,490,620 B1 | 11/2016 | Albrecht et al. | |
| 9,508,393 B1 * | 11/2016 | Le | G11B 33/1466 |
| 2001/0028525 A1 * | 10/2001 | Lofstrom | G11B 33/08 360/99.19 |
| 2003/0179489 A1 * | 9/2003 | Bernett | G11B 33/1466 360/97.22 |
| 2005/0068666 A1 * | 3/2005 | Albrecht | G11B 33/1466 360/99.18 |
| 2006/0176610 A1 * | 8/2006 | Tsuda | G11B 25/043 360/99.21 |
| 2008/0024908 A1 | 1/2008 | Nakamiya et al. | |
| 2008/0088969 A1 * | 4/2008 | Uefune | G11B 33/1466 360/99.21 |
| 2008/0212237 A1 * | 9/2008 | Uefune | G11B 25/043 360/254 |
| 2008/0310048 A1 * | 12/2008 | Hirono | G11B 33/1466 360/97.16 |
| 2011/0038076 A1 * | 2/2011 | Hayakawa | G11B 25/043 360/97.16 |
| 2011/0211279 A1 | 9/2011 | Jacoby et al. | |
| 2011/0212281 A1 * | 9/2011 | Jacoby | G11B 25/043 428/35.8 |
| 2012/0176701 A1 | 7/2012 | Schreck | |
| 2012/0275287 A1 * | 11/2012 | McGuire, Jr. | G11B 25/043 369/75.11 |
| 2013/0170074 A1 * | 7/2013 | Hayakawa | G11B 33/148 360/97.22 |
| 2014/0240869 A1 * | 8/2014 | Furuta | G11B 33/1446 360/110 |
| 2016/0307606 A1 | 10/2016 | McGuire, Jr. et al. | |
| 2016/0329081 A1 | 11/2016 | McGuire, Jr. | |

FOREIGN PATENT DOCUMENTS

| | | |
|---|---|---|
| JP | 02273258 A | 11/1990 |
| JP | 05089652 A | 4/1993 |
| JP | 08045256 A | 2/1996 |
| JP | 08161881 A | 6/1996 |
| JP | 10055662 A * | 2/1998 |
| JP | 3413562 B2 | 6/2003 |
| JP | 2010003356 A | 1/2010 |
| WO | WO2009086435 A2 | 7/2009 |
| WO | WO2012094434 A1 | 7/2012 |

OTHER PUBLICATIONS

Kimihiko Sudo et al., Hermetic Sealing of Hard Disk Drive Using Laminated Film Seal, U.S. Appl. No. 14/964,414, filed by same Applicant/Assignee on same date herewith.

S. Fujio, Hard Disk Drive Enclosure Sealing for Electromagnetic Noise Immunity, IP.com, included in the prior art Database Mar. 27, 2005 (Original Publication Date: Jun. 1, 1994), 2 pp., IP.com Disclosure No. IPCOM000112786D, IBM, downloaded from https://priorart.ip.com/IPCOM/000112786.

* cited by examiner

HERMETIC SEALING OF HARD DISK DRIVE USING LAMINATED FILM SEAL

FIELD OF EMBODIMENTS

Embodiments of the invention may relate generally to hard disk drives and more particularly to use of a film laminate for hermetically sealing a hard disk drive.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

HDDs are being manufactured which are hermetically sealed with helium inside. Further, other gases that are lighter than air have been contemplated for use as a replacement for air in sealed HDDs. There are various benefits to sealing and operating an HDD in helium ambient, for example, because the density of helium is one-seventh that of air. Hence, operating an HDD in helium reduces the drag force acting on the spinning disk stack, and the mechanical power used by the disk spindle motor is substantially reduced. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. The reliability of the HDD is also increased due to low humidity, less sensitivity to altitude and external pressure variations, and the absence of corrosive gases or contaminants.

Electronic systems that require a hermetically-sealed internal volume (e.g., a lighter-than-air gas filled, sealed HDD) need a way of connecting electrical lines through the enclosure. This may be accomplished with a hermetic electrical connector, or electrical "feed-through". One approach to hermetically sealing such an electrical feed-through is to apply solder around the perimeter of the feed-through near where the feed-through interfaces with the HDD enclosure base. However, such a soldering process may be a relatively costly process in the context of mass production of HDDs.

Another approach to connecting electrical lines through a hermetically-sealed HDD enclosure may involve routing of an electrical flexible cable assembly (or "flex cable") directly through an opening in the enclosure. However, this approach may also be a relatively costly process in the context of mass production of HDDs, as well as pose challenges regarding achieving a robust hermetic seal.

Furthermore, electronic systems that require a hermetically-sealed internal volume (e.g., a lighter-than-air gas filled, sealed HDD) need a way of hermetically sealing the cover to the base. One approach is to utilize two covers, one being the typical HDD cover coupled to the base with fasteners (a "first cover") but not hermetically-sealed, with another cover (a "second cover") being welded to the base over the first cover, such as by laser welding. However, once again such a soldering process is a relatively costly process in the context of mass production of HDDs.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are generally directed at a hard disk drive (HDD) in which a laminated film seal is used to hermetically seal an HDD cover-to-base interface, and a method for sealing such an HDD. The laminated film seal may comprise (a) a heat sealant layer forming a seal with the base, and possibly with the second cover, (b) a barrier layer which inhibits gas from escaping (or egressing) from inside the HDD, and (c) a film surface protective layer which protects the heat sealant and barrier layers. Alternative embodiments include positioning the laminated film over and bonding with a second cover, and positioning the laminated film between first and second covers and bonding with the second cover and the base.

Embodiments may include a heat sealant layer comprising a thermoplastic polymer, such as polypropylene for a non-limiting example; a barrier layer comprising a metal, such as aluminum for a non-limiting example; and a film surface protective layer comprising a thermoplastic polymer, such as polyethylene terephthalate for a non-limiting example.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a laminated film seal for a hermetically-sealed hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a hermetic seal for a hard disk drive (HDD) storage device. Thus, in accordance with an embodiment, a plan view illustrating an HDD 100 is shown in FIG. 1 to illustrate an exemplary operating context.

Figure 1:
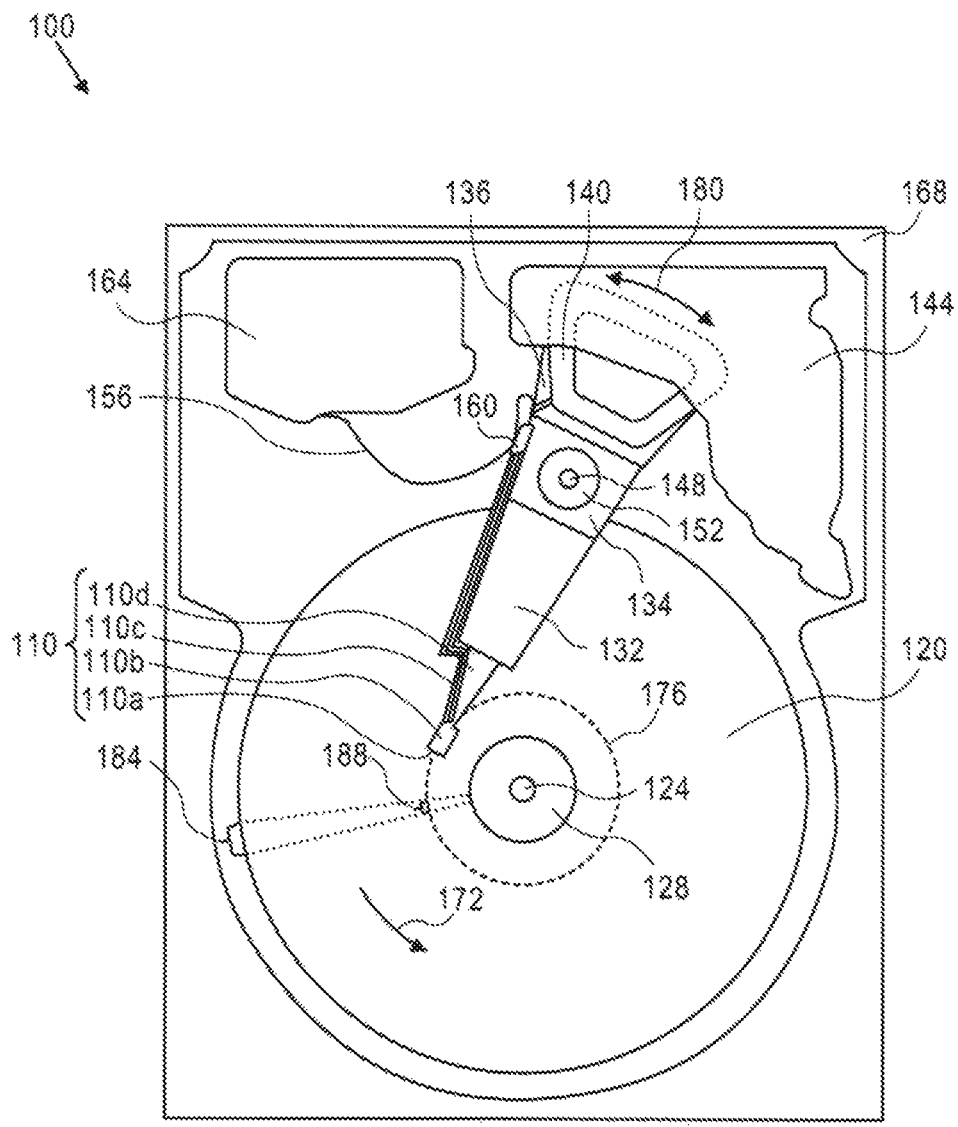
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically-sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, not be absolutely leak-free.

Recall that with a hermetically-sealed hard disk drive (HDD) there needs to be a way of connecting electrical lines through the enclosure, such as to an onboard printed circuit board that is external to the sealed volume of the enclosure, and this may be accomplished with a hermetic electrical feed-through soldered to the HDD base, an example of which follows.

Figure 2:
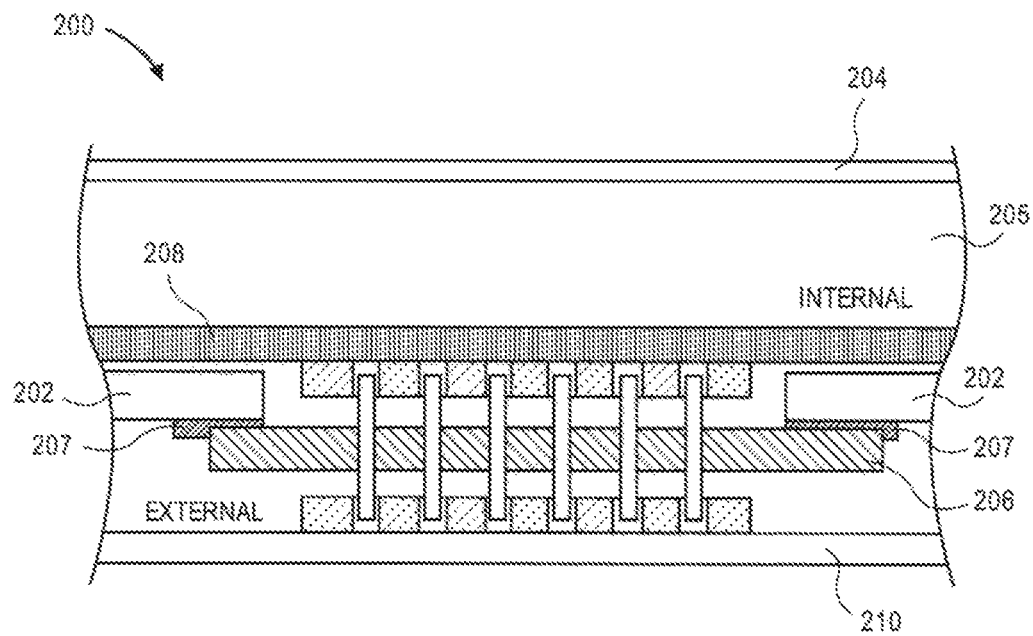
FIG. 2 is a cross-sectional side view illustrating an HDD electrical feed-through interface.

FIG. 2 is a cross-sectional side view illustrating an HDD electrical feed-through interface. Hermetically-sealed HDD 200 comprises an enclosure base 202 coupled with an HDD cover 204, thereby enclosing a sealed internal space 205. In order to electrically connect a flexible cable assembly 208 that is located inside the internal space 205 with a printed circuit board (PCB) 210 that is coupled to the base 202 outside of the internal space 205, a hermetic electrical connector 206 (or "feed-through" or "feed-through connector") is used at the interface between the internal space 205 and the external environment, i.e., at an orifice of the base 202. The connector 206 is attached to the base 202 using solder 207. In the configuration depicted in FIG. 2, the connector 206 is shown soldered to the underside of the base 202. While effective hermetically, the foregoing sealing arrangement may not be the most cost-effective approach.

Recall also that another approach to connecting electrical lines through a hermetically-sealed HDD enclosure may involve routing of an electrical flexible cable assembly (or "flex cable") directly through an opening in the enclosure, but that this approach may also pose challenges with achieving a robust hermetic seal.

Recall also that electronic systems that require a hermetically-sealed internal volume may also need a way of hermetically sealing the cover to the base, which may involve welding of a second cover to the base, over the first cover, to achieve a hermetic seal, but that this approach may not be the most cost-effective approach either.

Laminated Film Seal for Hermetically-Sealed Hard Disk Drive

An approach to sealing a hard disk drive, for example, sealing a hard disk drive (HDD) around its electrical feed-through interface, involves the use of a laminated film seal structure.

Figure 3:
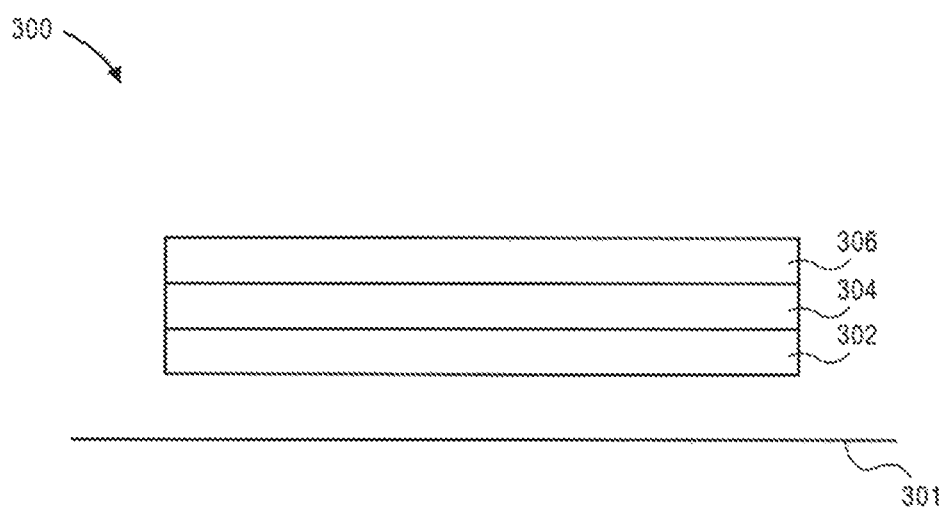
FIG. 3 is a cross-sectional side view illustrating a laminated film seal, according to an embodiment.

FIG. 3 is a cross-sectional side view illustrating a laminated film seal, according to an embodiment. A laminated film seal (or "seal laminate") relies on a laminated film structure to provide a hermetic seal. According to an embodiment, a laminated film seal is created based on a heat-sealing film or laminate bonded to at least one surface 301.

Laminated film 300 comprises a heat sealant layer 302 capable of forming a bond with another surface through the use of a heat-sealing process, e.g., based on corresponding ranges of temperature and pressure. Heat sealant layer 302 is covered by a barrier layer 304, which is designed to inhibit the escape (or "egress" or "diffusion") of gas through the laminated film 300, i.e., to be hermetically permeable (or "impermeable"). Barrier layer 304 is covered by a film surface protective layer 306, which is designed to protect the heat sealant layer 302 and the barrier layer 304. Other additional layers may also be present in a laminated film such as laminated film 300, the material and structure of which may vary from implementation to implementation. For example, a metal adhesive layer with a polymeric base material may be implemented instead of or in addition to the heat sealant layer 302, or the heat sealant layer 302 may be constituent to a metal adhesive layer. In the case of a hermetically-sealed HDD, the laminated film 300 should be designed and configured to inhibit the egress of helium (He), nitrogen (N), or whatever lighter-than-air gas may be used within the sealed HDD.

According to an embodiment, the heat sealant layer 302 comprises a thermoplastic polymer or resin, such as polypropylene (also known as polypropene) [chemical formula= $(C_3H_6)_n$], polyethylene (also known as polyethene) [chemical formula=$(C_2H_4)_n$], and like polymers. According to a related embodiment, the heat sealant layer 302 comprises polypropylene.

According to an embodiment, the barrier layer 304 comprises a metal, such as aluminum, stainless steel, copper, and the like, having a relatively low permeability in relation to the target lighter-than-air gas being used to fill an HDD. According to a related embodiment, the barrier layer 304 comprises aluminum.

According to an embodiment, the barrier layer 304 comprises a copolymer or resin, such as ethylene vinyl alcohol (EVOH) [chemical formula=$(C_2H_4O-C_2H_4)_x$].

According to an embodiment, the film surface protective layer 306 comprises a thermoplastic polymer or resin, such as polyethylene terephthalate (PET) [chemical formula= $(C_{10}H_8O_4)_n$], polypropylene, and like polymers. According to a related embodiment, the heat sealant layer 302 comprises PET.

Laminated Film Seal for Electrical Feed-Through Connector

Figure 4A:
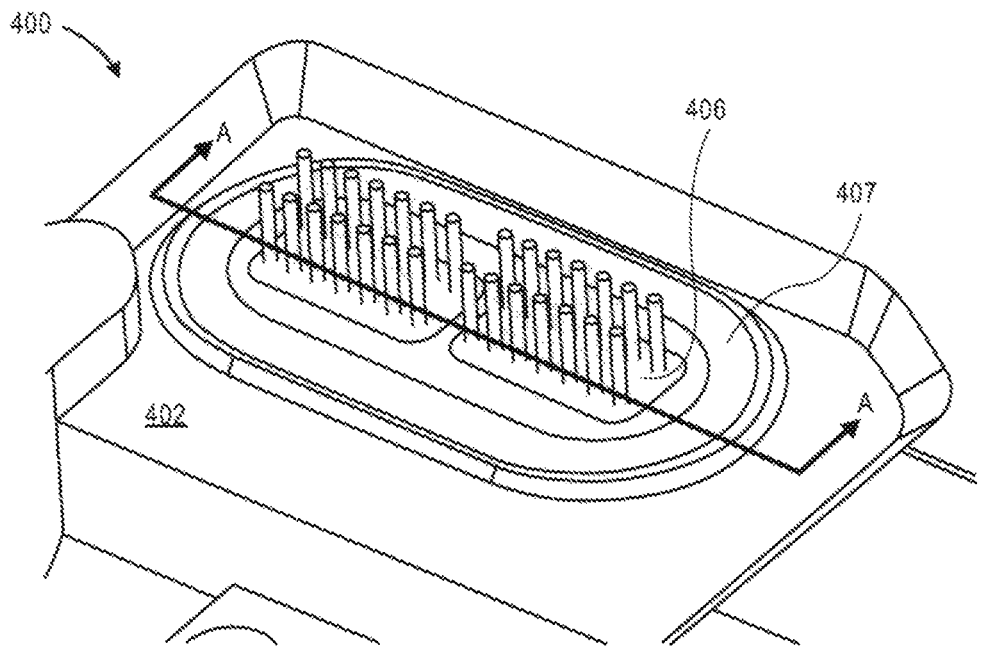
FIG. 4A is a perspective view illustrating an HDD electrical feed-through connector interface, according to an embodiment.

FIG. 4A is a perspective view illustrating an HDD electrical feed-through connector interface, according to an embodiment. Interface 400 is depicted as comprising an HDD enclosure base 402 (outside shown), with which a hermetic electrical connector 406 is coupled, and whereby the interface 400 is sealed with a laminated film 407. According to embodiments, laminated film 407 is constructed as illustrated and described in reference to laminated film 300 (FIG. 3).

Figure 4B:
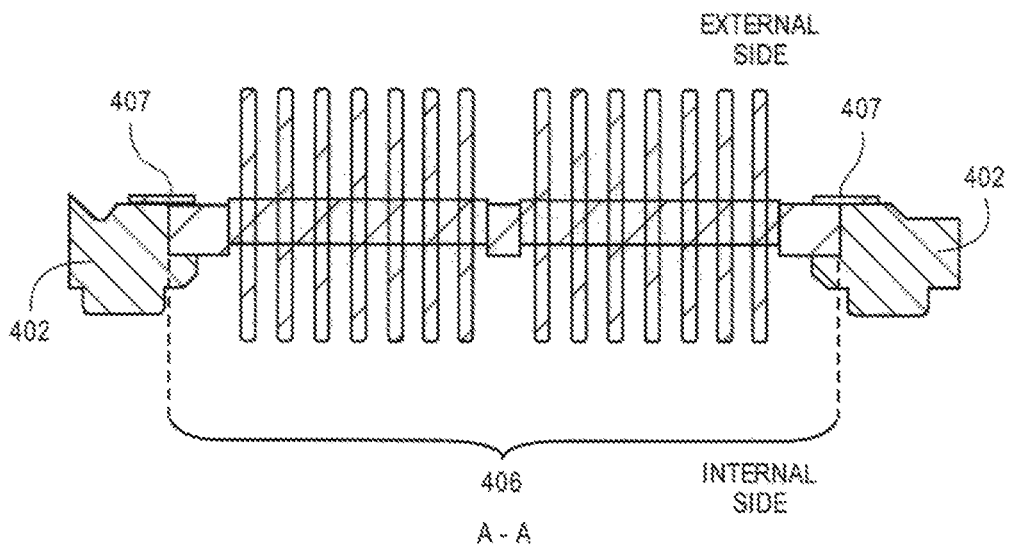
FIG. 4B is a cross-sectional side view illustrating the HDD electrical feed-through connector interface of FIG. 4A, according to an embodiment.

FIG. 4B is a cross-sectional side view illustrating the HDD electrical feed-through connector interface of FIG. 4A, according to an embodiment. Again, interface 400 is depicted as comprising the HDD enclosure base 402 with which the hermetic electrical connector 406 is coupled, and whereby the interface 400 is sealed with the laminated film 407, constructed as illustrated and described in reference to laminated film 300 (FIG. 3), and bonded with a surface of the base 402 and a surface of the electrical connector 406. According to an embodiment and as depicted, the seal corresponding to laminated film 407 is positioned at the interface 400 such that the laminated film 407 overlaps with both of the surfaces of the base 402 and the electrical connector 406. Hence, the laminated film 407 encircles the outer perimeter of the electrical connector 406, as depicted in FIGS. 4A, 4B.

A First Method of Sealing a Hard Disk Drive

Figure 5:
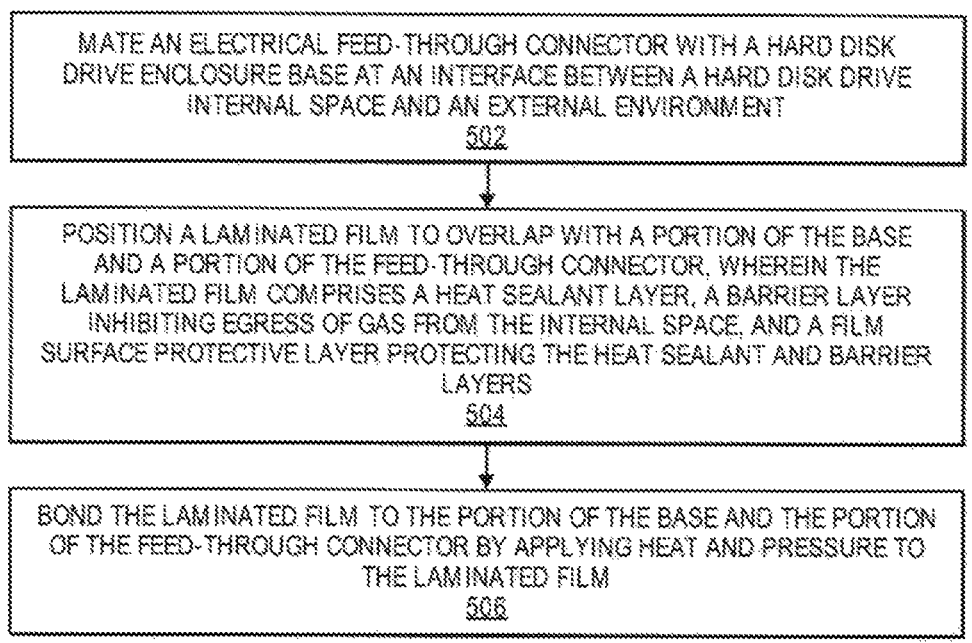
FIG. 5 is a flow diagram illustrating a method of sealing an HDD, according to an embodiment.

FIG. 5 is a flow diagram illustrating a method of sealing an HDD, according to an embodiment.

At block 502, an electrical feed-though connector is mated with a hard disk drive (HDD) enclosure base at an interface between an HDD internal space and an external environment. For example, hermetic electrical connector 406 (FIGS. 4A, 4B) is suitably positioned to mate with HDD enclosure base 402. As depicted in FIG. 4B, the connector 406 may be mated with the base 402 from the external side, i.e., from the outside of the HDD. However, precisely how the connector 406 is mated with the base 402 may vary from implementation to implementation.

At block 504, a laminated film is positioned to overlap with a portion of the base and a portion of the feed-through connector, where the laminated film comprises (a) a heat sealant layer, (b) a barrier layer that can inhibit the egress of gas from the internal space, and (c) a film surface protective layer protecting the heat sealant and barrier layers. For example, laminated film 407 (FIGS. 4A, 4B), structurally configured similarly to how illustrated and described in reference to laminated film 300 of FIG. 3, is positioned to overlap with a portion of the enclosure base 402 (FIGS. 4A, 4B) and a portion of the feed-through connector 406 (FIGS. 4A, 4B), like is illustrated in FIGS. 4A, 4B. According to an embodiment, the laminated film is positioned to encircle the outer perimeter of the feed-through connector, similar to as depicted in FIG. 4A, for example.

At block 506, the laminated film is bonded to the portion of the base and the portion of the feed-through connector by applying heat and pressure to the laminated film. Hence, a laminated film seal is formed by such a bonding process. For example, a heat-sealing bar that applies heat and pressure is positioned in suitable relation with laminated film 407 (FIGS. 4A, 4B) such that the heat sealant layer (e.g., heat sealant layer 302 of laminated film 300 of FIG. 3) bonds to the base 402 (FIGS. 4A, 4B) and the connecter 406 (FIGS. 4A, 4B). Heat-sealing (or heat sealant) materials, such as polypropylene, and heat-sealing films are such that they seal to a surface in response to a suitable range of heat and pressure.

Laminated Film Seal for Electrical Flexible Cable Assembly

Figure 6A:
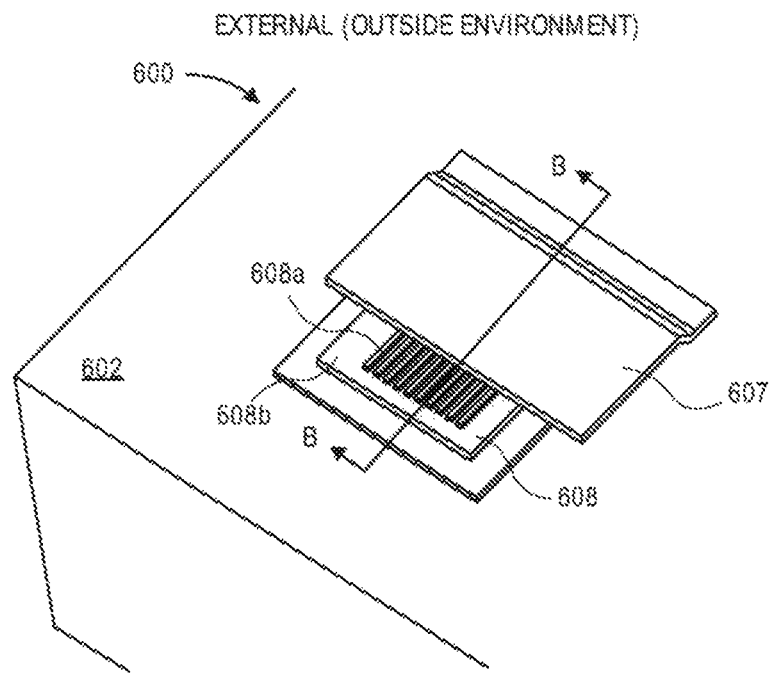
FIG. 6A is a perspective view illustrating an HDD electrical flexible cable assembly (FCA) interface, according to an embodiment.

FIG. 6A is a perspective view illustrating an HDD electrical flexible cable assembly (FCA) interface, according to an embodiment. Interface 600 is depicted as comprising an HDD enclosure base 602 (outside shown), with which an electrical flexible cable assembly (FCA) 608 is coupled in order to provide an electrical path from the HDD internal space through the base 602 to the outside environment. The interface 600 is sealed with a laminated film 607.

According to an embodiment, FCA 608 comprises an electrical conductor layer 608a coupled to a base film 608b, and laminated film 607 is constructed as illustrated and described in reference to laminated film 300 (FIG. 3). According to an embodiment, the base film 608b comprises a polypropylene material, which is less hygroscopic than a polyimide material and, therefore, provides for a more moisture-resistant HDD. According to an embodiment, the laminated film 607 is positioned over a portion of the FCA 608 and functions to seal the interface 600 of the FCA 608 and the base 602.

Figure 6B:
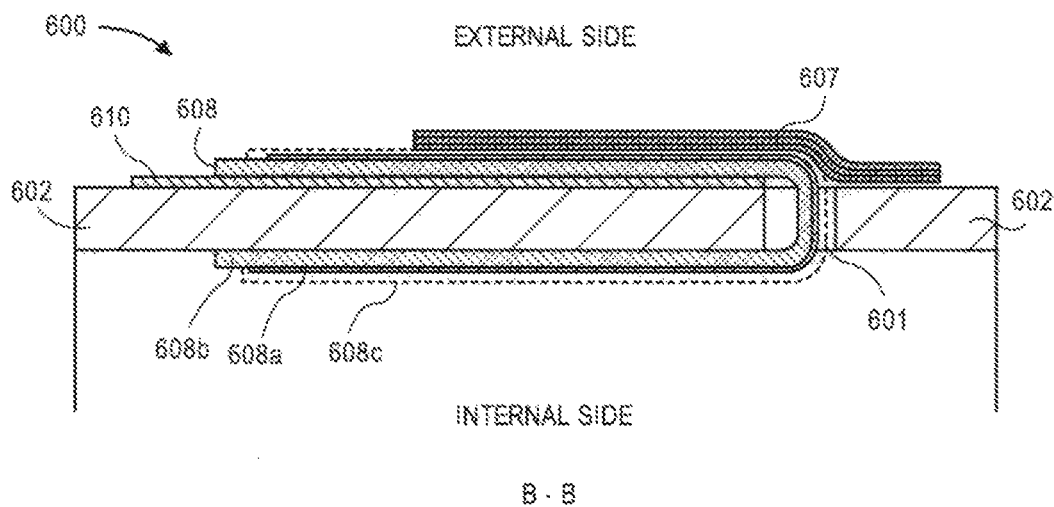
FIG. 6B is a cross-sectional side view illustrating the HDD electrical FCA of FIG. 6A, according to an embodiment.

FIG. 6B is a cross-sectional side view illustrating the HDD electrical FCA of FIG. 6A, according to an embodiment. Interface 600 is depicted as comprising the HDD enclosure base 602 having a hole 601 through which the FCA 608 is routed between the internal space (e.g., internal side) and the outside environment (e.g., external side). As the interface 600 is sealed with the laminated film 607, which overlaps and mates with a portion of the FCA 608 and part of the base 602, a heat sealant layer (e.g., heat sealant layer 302 of FIG. 3) of the laminated film 607 is constructed and positioned to bond with the base 602 and with the FCA 608. According to an embodiment, the remainder of the laminated film 607 may be constructed as illustrated and described in reference to FIG. 3.

There are multiple approaches to the construction of the FCA 608. According to one embodiment, FCA 608 comprises a cover layer 608c over the electrical conductor layer 608a, and the laminated film 607 is positioned over and bonded with at least a portion of the cover layer 608c of FCA 608. According to an embodiment, the cover layer 608c is constructed of a thermoplastic polymer (or resin). According to a related embodiment, the cover layer 608c of the FCA 608 and the heat sealant layer (e.g., heat sealant layer 302 of FIG. 3) of the laminated film 607 both comprise polypropylene, thereby facilitating a bond between the heat sealant layer and the cover layer 608c, as well as with the base 602, upon application of suitable heat and pressure for heat-seal bonding.

Another approach to the construction of the FCA 608 is one in which the FCA 608 does not comprise a cover layer over the electrical conductor layer. Rather, and according to an embodiment, a metal adhesive layer 610 is positioned between the base 602 and the FCA 608, and the laminated film 607 is positioned over and bonded with at least a portion of the metal adhesive layer 610, in addition to the electrical conductor layer 608a, the base film 608b, and the base 602.

A Second Method of Sealing a Hard Disk Drive

Figure 7:
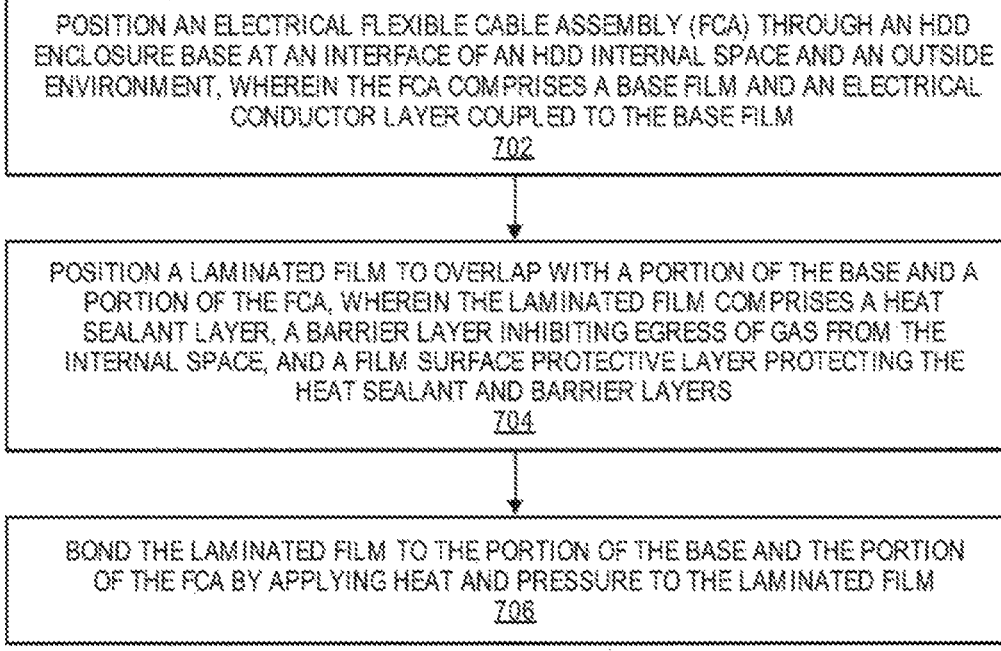
FIG. 7 is a flow diagram illustrating a method of sealing an HDD, according to an embodiment.

FIG. 7 is a flow diagram illustrating a method of sealing an HDD, according to an embodiment.

At block 702, an electrical flexible cable assembly (FCA) is positioned through an HDD enclosure base at an interface of an HDD internal space and an outside environment, where the FCA comprises a base film and an electrical conductor layer coupled to the base film. For example, FCA 608 (FIGS. 6A, 6B) is positioned through the hole 601 (FIG. 6B) of the base 602 (FIGS. 6A, 6B), where the hole 601 extends between the internal side and the external side of the base 602. Continuing with the example, FCA 608 is constructed of the electrical conductor layer 608a (FIGS. 6A, 6B) coupled to the base film 608b (FIGS. 6A, 6B).

At block 704, a laminated film is positioned to overlap with a portion of the base and a portion of the FCA, where the laminated film comprises (a) a heat sealant layer, (b) a barrier layer that can inhibit the egress of gas from the internal space, and (c) a film surface protective layer protecting the heat sealant and barrier layers. For example, laminated film 607 (FIGS. 6A, 6B), according to an embodiment structurally configured similarly to how illustrated and described in reference to laminated film 300 of FIG. 3, is positioned to overlap with a portion of the enclosure base 602 (FIGS. 6A, 6B) and a portion of the FCA 608 (FIGS. 6A, 6B), like is illustrated in FIGS. 6A, 6B.

At block 706, the laminated film is bonded to the portion of the base and the portion of the FCA by applying heat and pressure to the laminated film. Hence, a laminated film seal is formed by such a bonding process. For example, a heat-sealing bar that applies heat and pressure is positioned in suitable relation with laminated film 607 (FIGS. 6A, 6B) such that the heat sealant layer (e.g., heat sealant layer 302 of laminated film 300 of FIG. 3) bonds to the base 602 (FIGS. 6A, 6B) and to the FCA 608 (FIGS. 6A, 6B). According to an embodiment, a metal adhesive layer 610 (FIG. 6B) is positioned and applied between the external side of the base 602 and the base film 608b of the FCA 608, such that the heat-sealing procedure causes the laminated film 607 to bond with the base 602 and with the metal adhesive layer 610, a portion over which the laminated film 607 is positioned. According to another embodiment, FCA 608 further comprises the cover layer 608c (FIG. 6B) over the electrical conductor layer 608a and the base film 608b, such that the heat-sealing procedure causes the laminated film 607 to bond with the base 602 and with the cover layer 608c of FCA 608.

Laminated Film Seal for Hermetically-Sealed Hard Disk Drive Cover

Figure 8A:
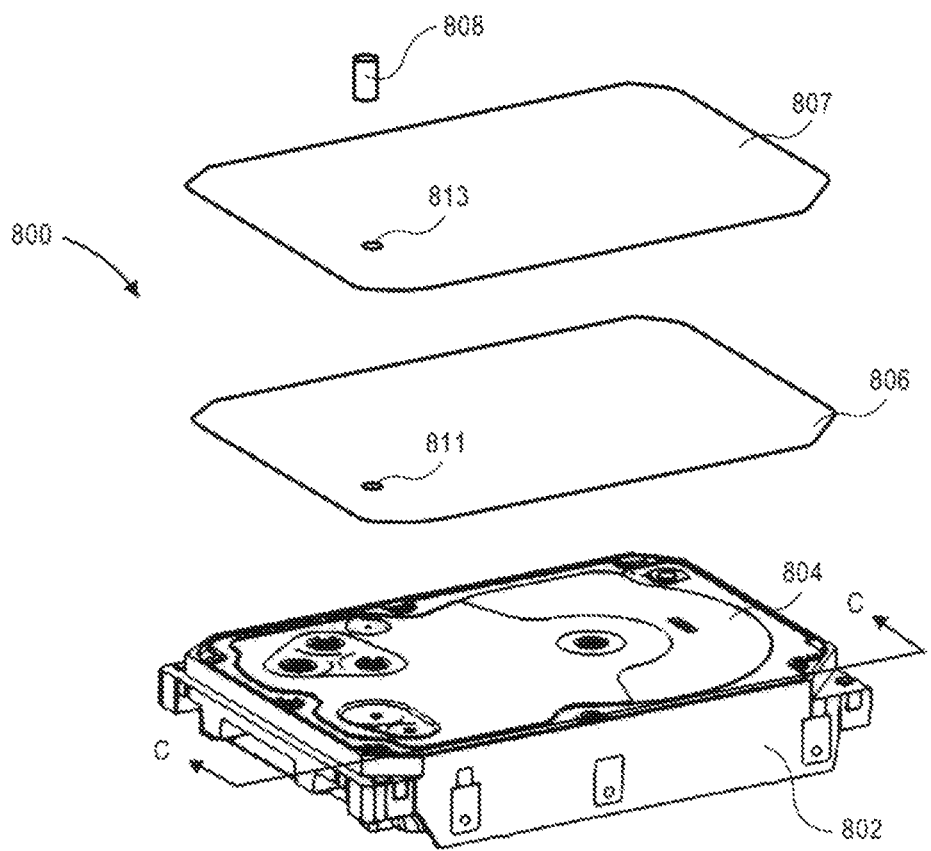
FIG. 8A is an exploded perspective view of a hermetically-sealed HDD having a second cover, according to an embodiment.

FIG. 8A is an exploded perspective view of a hermetically-sealed HDD having a second cover, according to an embodiment. Hermetically-sealed HDD 800 comprises a first cover 804 attached to an HDD enclosure base 802, and a second cover 806 positioned over the first cover 804. According to an embodiment, a laminated film 807, constructed as illustrated and described in reference to laminated film 300 (FIG. 3), is positioned over the second cover 806. FIG. 8A further depicts that each of the second cover 806 and the laminated film 807 have a small hole 811, 813, respectively, through which gas may be injected into the internal space of the HDD 800. Once the gas injection process is completed, a small pin 808 may be used to plug the hole 811 in the second cover 806 and the hole 813 in the laminated film 807.

The second cover 806 provides a low-permeability barrier to the egress of the gas contained within the internal space of HDD 800. For example, second cover 806 may be constructed of a metal, through which gas is relatively (although not absolutely) impermeable. However, the second cover 806 still needs to be hermetically-sealed with the base 802, i.e., the interface between the second cover 806 and the base 802 needs to be sealed. Hence, according to an embodiment, the laminated film 807 is utilized to hermetically seal the second cover 806 to the base 802. That is, the heat sealant layer (e.g., heat sealant layer 302 of FIG. 3) covers the second cover 806 and is heat-sealed to a portion of the base 802. The heat sealant layer may be further heat-sealed to the surface of the second cover 806.

Figure 8B:
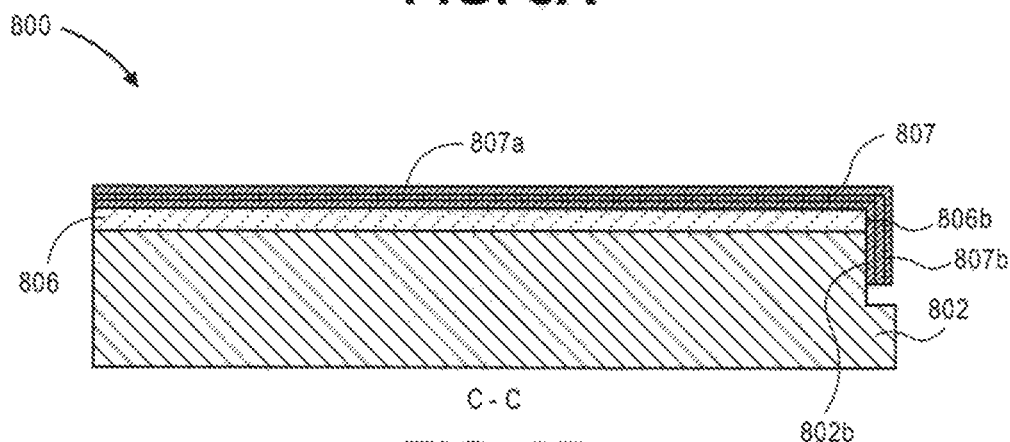
FIG. 8B is a cross-sectional side view illustrating the hermetically-sealed HDD of FIG. 8A, according to an embodiment.

FIG. 8B is a cross-sectional side view illustrating the hermetically-sealed HDD of FIG. 8A, according to an embodiment. Hermetically-sealed HDD 800 is again depicted as comprising the HDD enclosure base 802, over which the second cover 806 is positioned, and over which the laminated film 807 is positioned. According to an embodiment, the laminated film 807 comprises (a) a planar portion 807a that is positioned substantially or relatively parallel with the second cover 806, e.g., the laminated film is laid upon the second cover 806, and (b) at least one sidewall portion 807b that is substantially normal to the planar portion 807a, and is positioned to mate with a corresponding sidewall 802b of the base 802. As the cover-to-base interface is sealed with the laminated film 807 upon application of suitable heat and pressure, the planar portion 807a of which overlaps with second cover 806 and the sidewall portion 807b of which overlaps with the sidewall 802b of the base 802, a heat sealant layer (e.g., heat sealant layer 302 of FIG. 3) of the laminated film 807 is constructed and positioned to bond with the sidewall 802b of the base 802. According to an embodiment, the heat sealant layer may be further heat-sealed to the surface of the second cover 806, such that the heat sealant layer is bonded with a sidewall 806b of the second cover 806 and bonded with the sidewall 802b of the base 802.

Figure 9A:
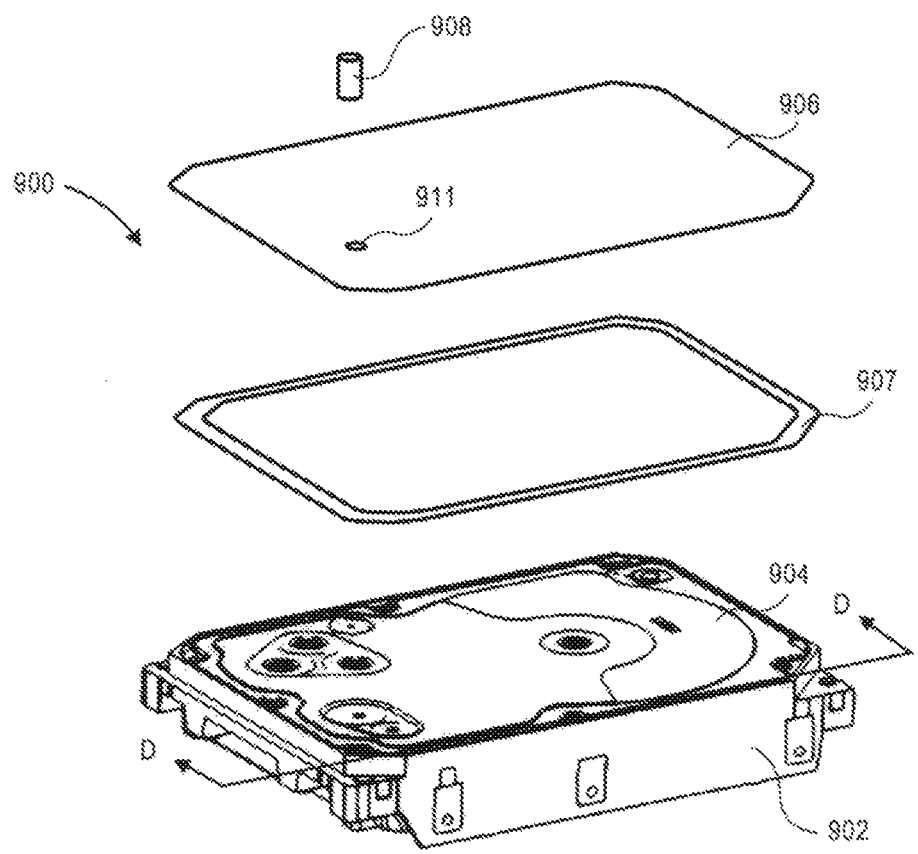
FIG. 9A is an exploded perspective view of a hermetically-sealed HDD having a second cover, according to an embodiment.

FIG. 9A is an exploded perspective view of a hermetically-sealed HDD having a second cover, according to an embodiment. Hermetically-sealed HDD 900 comprises a first cover 904 attached to an HDD enclosure base 902, and a second cover 906 positioned over the first cover 904. According to an embodiment, a laminated film 907, constructed as illustrated and described in reference to laminated film 300 (FIG. 3), is positioned between the first cover 904 and the second cover 906. According to an embodiment and as generally depicted in FIG. 9A, the laminated film 907 may be fabricated into a shape that mates with the outer perimeter surface of the base 902 as well as the outer perimeter area of the second cover 906. Thus, with such a shape, the laminated film 907 can function like a gasket seal between the base 902 and the second cover 906. FIG. 9A further depicts that the second cover 906 has a small hole 911 through which gas may be injected into the internal space of the HDD 900. Once the gas injection process is completed, a small pin 908 may be used to plug the hole 911 in the second cover 906.

The second cover 906 provides a low-permeability barrier to the egress of the gas contained within the internal space of HDD 900. For example, second cover 906 may be constructed of a metal, through which gas is relatively (although not absolutely) impermeable. However, the second cover 906 still needs to be hermetically-sealed with the base 902, i.e., the interface between the second cover 906 and the base 902 needs to be sealed. Hence, according to an embodiment, the laminated film 907 is utilized to hermetically seal the second cover 906 to the base 902. That is, the heat sealant layer (e.g., heat sealant layer 302 of FIG. 3) overlaps with the first cover 904 and is below the second cover 906, and is therefore heat-sealed to the second cover 906 and heat-sealed to a portion of the base 902.

Figure 9B:
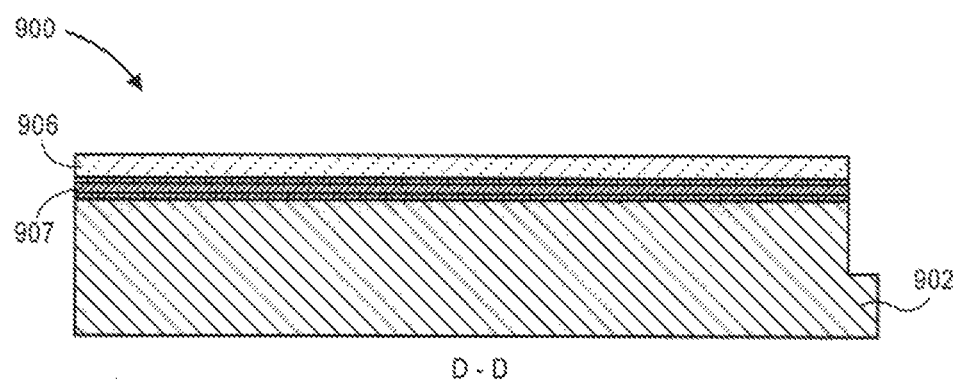
FIG. 9B is a cross-sectional side view illustrating the hermetically-sealed HDD of FIG. 9A, according to an embodiment.

FIG. 9B is a cross-sectional side view illustrating the hermetically-sealed HDD of FIG. 9A, according to an embodiment. Hermetically-sealed HDD 900 is again depicted as comprising the HDD enclosure base 902, over which the laminated film 907 is positioned, and over which the second cover 906 is positioned. According to an embodiment, the laminated film 907 further comprises a metal adhesive layer, which is positioned to mate and cohesively bond with a corresponding area of the second cover 906 and of the base 902 upon application of suitable heat and pressure.

A Third Method of Sealing a Hard Disk Drive

Figure 10:
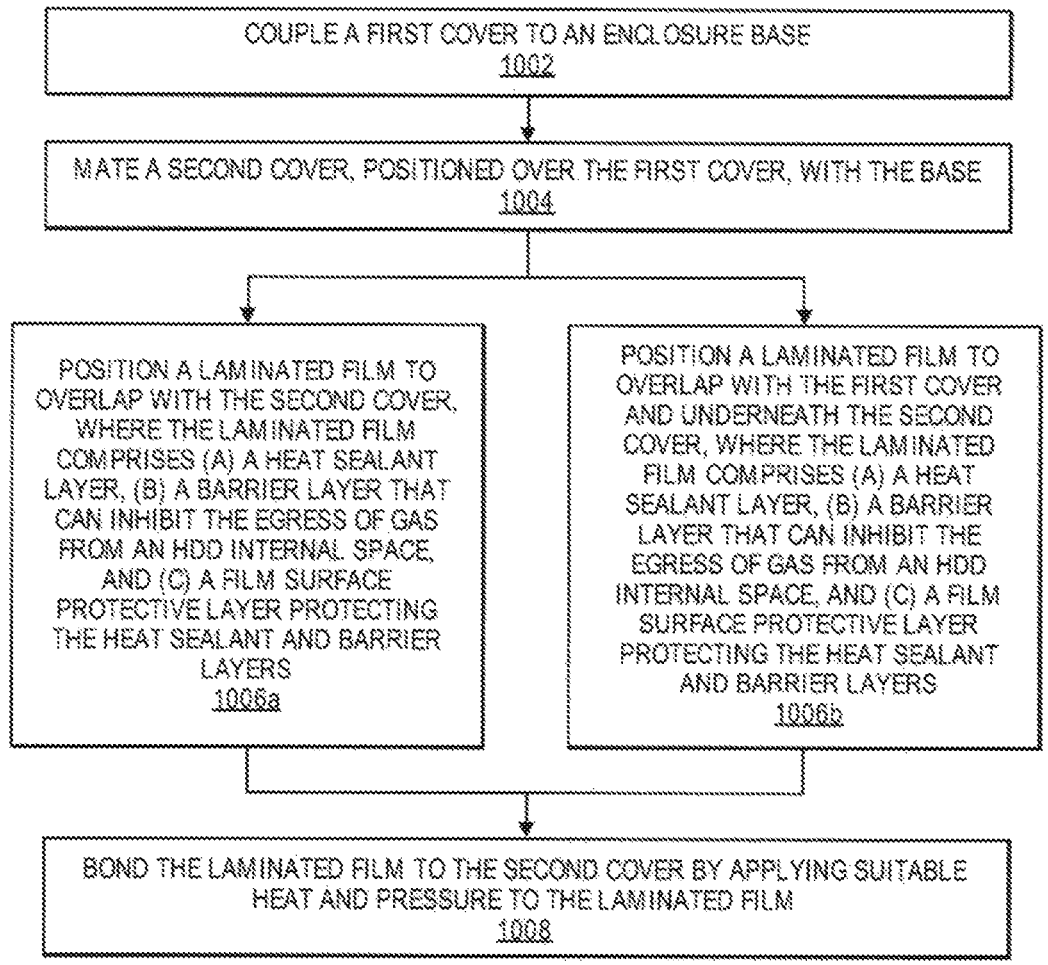
FIG. 10 is a flow diagram illustrating a method of sealing an HDD, according to an embodiment.

FIG. 10 is a flow diagram illustrating a method of sealing an HDD, according to an embodiment.

At block 1002, a first cover is coupled to an enclosure base. For example, first cover 804 (FIG. 8A) is coupled to the base 802 (FIGS. 8A, 8B), or first cover 904 (FIG. 9A) is coupled to the base 902 (FIGS. 9A, 9B).

At block 1004, a second cover, positioned over the first cover, is mated with the base. For example, second cover 806 (FIGS. 8A, 8B) is mated with the base 802 (FIGS. 8A, 8B), or second cover 906 (FIGS. 9A, 9B) is mated with the base 902 (FIGS. 9A, 9B).

At blocks 1006a, 1006b, a laminated film is positioned to overlap with a cover, where the laminated film comprises (a) a heat sealant layer, (b) a barrier layer that can inhibit the egress of gas from the internal space, and (c) a film surface protective layer protecting the heat sealant and barrier layers. For example, at block 1006a, laminated film 807 (FIGS. 8A, 8B), according to an embodiment structurally configured similarly to how illustrated and described in reference to laminated film 300 of FIG. 3, is positioned to overlap with the second cover 806 (FIGS. 8A, 8B). For another example, at block 1006b, laminated film 907 (FIGS. 9A, 9B), according to an embodiment structurally configured similarly to how illustrated and described in reference to laminated film 300 of FIG. 3, is positioned to overlap with the first cover 904 (FIGS. 9A, 9B) but underneath the second cover 906 (FIGS. 9A, 9B).

At block 1008, the laminated film is bonded to the second cover by applying suitable heat and pressure to the laminated film. Hence, a laminated film seal is formed by such a bonding process. For example, a heat-sealing bar that applies heat and pressure is positioned in suitable relation with laminated film 807 (FIGS. 8A, 8B), positioned to overlap with the second cover 806 (FIGS. 8A, 8B), such that the heat sealant layer (e.g., heat sealant layer 302 of laminated film 300 of FIG. 3) bonds to the second cover 806. Further, as described and illustrated in reference to FIG. 8B, the laminated film 807 may be folded or bent over a portion of the sides of the base 802 (FIGS. 8A, 8B), thereby bonding with the sidewall 802b (FIGS. 8A, 8B) of the base 802, and possibly also with the sidewall 806b of the second cover 806, upon application of suitable heat and pressure. For another example, laminated film 907 (FIGS. 9A, 9B), positioned to overlap with at least a portion of the first cover 904 (FIGS. 9A, 9B) and the base 902 (FIGS. 9A, 9B) but underneath the second cover 906 (FIGS. 9A, 9B), is bonded with the second cover 906 and to the base 902.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hermetically-sealed hard disk drive having an internal space, the hard disk drive comprising:
    an enclosure base;
    a first cover coupled to said base;
    a second cover positioned over said first cover and coupled to said base;
    a laminated film comprising:
        a heat sealant layer hermetically-coupled with said base, wherein said heat sealant layer is composed of a material that forms a heat seal with a mating surface upon application of a sufficient amount of heat to said heat sealant layer,
        a barrier layer inhibiting escape of gas from said internal space, and
        a film surface protective layer protecting said heat sealant and barrier layers; and
    a heat seal formed from said heat sealant layer of said laminated film.

2. The hermetically-sealed hard disk drive of claim 1, wherein said laminated film is positioned over said second cover and bonded with at least a portion of said second cover.

3. The hermetically-sealed hard disk drive of claim 1, wherein said laminated film is positioned over said second cover and comprises:
- a planar portion positioned substantially parallel with said second cover, and
- at least one sidewall portion substantially normal to said planar portion and mating with a corresponding sidewall of said base; and
- wherein said heat sealant layer is bonded with said sidewall of said base.

4. The hermetically-sealed hard disk drive of claim 1, wherein said second cover comprises a sidewall extending from a planar portion and mating with a corresponding sidewall of said base, and wherein said laminated film is positioned over said second cover and comprises:
- a planar portion positioned substantially parallel with said second cover, and
- at least one sidewall portion substantially normal to said planar portion and mating with a corresponding sidewall of said second cover and a corresponding sidewall of said base; and
- wherein said heat sealant layer is bonded with said sidewall of said second cover and with said sidewall of said base.

5. The hermetically-sealed hard disk drive of claim 1, wherein said laminated film is positioned between said first cover and said second cover and is bonded with at least a portion of said base.

6. The hermetically-sealed hard disk drive of claim 1, wherein said laminated film is positioned between said first cover and said second cover and is bonded with second cover and with at least a portion of said base.

7. The hermetically-sealed hard disk drive of claim 1,
- wherein said laminated film further comprises a metal adhesive layer; and
- wherein said laminated film is positioned between said first cover and said second cover and said metal adhesive layer is bonded with said second cover and with at least a portion of said base.

8. The hermetically-sealed hard disk drive of claim 1, wherein said heat sealant layer comprises a thermoplastic polymer.

9. The hermetically-sealed hard disk drive of claim 1, wherein said heat sealant layer comprises polypropylene.

10. The hermetically-sealed hard disk drive of claim 1, wherein said barrier layer comprises a metal.

11. The hermetically-sealed hard disk drive of claim 1, wherein said barrier layer comprises aluminum.

12. The hermetically-sealed hard disk drive of claim 1, wherein said film surface protective layer comprises a thermoplastic polymer.

13. The hermetically-sealed hard disk drive of claim 1, wherein said film surface protective layer comprises polyethylene terephthalate.

14. The hermetically-sealed hard disk drive of claim 1,
- wherein said heat sealant layer comprises polypropylene;
- wherein said barrier layer comprises aluminum; and
- wherein said film surface protective layer comprises polyethylene terephthalate.

15. A method of sealing a hard disk drive (HDD) having an internal space, the method comprising:
- coupling a first cover to an enclosure base;
- mating a second cover, positioned over said first cover, with said enclosure base;
- positioning a laminated film to overlap with said second cover, wherein said laminated film comprises a heat sealant layer, a barrier layer inhibiting egress of gas from said internal space, and a film surface protective layer protecting said heat sealant and barrier layers, wherein said heat sealant layer is composed of a material that forms a heat seal with a mating surface upon application of a sufficient amount of heat to said heat sealant layer; and
- forming a heat seal from said laminated film to said second cover by applying heat and pressure to said laminated film.

16. The method of claim 15,
wherein positioning said laminated film comprises:
- positioning a planar portion of said laminated film substantially parallel with said second cover, and
- positioning at least one sidewall portion of said laminated film, which is substantially normal to said planar portion, to mate with a corresponding sidewall of said base; and
further comprising bonding said laminated film to said sidewall of said base.

17. The method of claim 15,
wherein positioning said laminated film comprises:
- positioning a planar portion of said laminated film substantially parallel with said second cover, and
- positioning at least one sidewall portion of said laminated film, which is substantially normal to said planar portion, to mate with a corresponding sidewall of said second cover and a corresponding sidewall of said base; and
further comprising bonding said laminated film to said sidewall of said second cover and to said sidewall of said base.

18. The method of claim 15, wherein:
said heat sealant layer comprises polypropylene;
said barrier layer comprises aluminum; and
said film surface protective layer comprises polyethylene terephthalate.

19. A method of sealing a hard disk drive (HDD) having an internal space, the method comprising:
- coupling a first cover to an enclosure base;
- positioning a laminated film to overlap with said first cover, wherein said laminated film comprises a heat sealant layer, a barrier layer inhibiting egress of gas from said internal space, and a film surface protective layer protecting said heat sealant and barrier layers;
- mating a second cover, positioned over said first cover and said laminated film, with said base; and
- bonding said laminated film to said second cover and to said base by applying heat and pressure to said laminated film.

20. The method of claim 19,
- wherein said laminated film further comprises a metal adhesive layer; and
- wherein bonding said laminated film includes bonding said metal adhesive layer to said second cover and to said base.

21. The method of claim 19, wherein:
said heat sealant layer comprises polypropylene;
said barrier layer comprises aluminum; and
said film surface protective layer comprises polyethylene terephthalate.

* * * * *